(12) United States Patent
Vincent et al.

(10) Patent No.: US 7,113,165 B2
(45) Date of Patent: Sep. 26, 2006

(54) MOLECULAR LIGHT VALVE DISPLAY HAVING SEQUENCED COLOR ILLUMINATION

(75) Inventors: Kent D. Vincent, Cupertino, CA (US); Xiao-An Zhang, Sunnyvale, CA (US); R. Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 10/280,228

(22) Filed: Oct. 25, 2002

(65) Prior Publication Data

US 2004/0080804 A1    Apr. 29, 2004

(51) Int. Cl.
   *G09G 3/38*   (2006.01)
(52) U.S. Cl. .................. 345/105; 345/107; 359/265; 385/16
(58) Field of Classification Search .................. 345/84, 345/88, 102, 105; 359/265, 273
   See application file for complete search history.

(56) References Cited

U.S. PATENT DOCUMENTS 5,337,068 A * 8/1994 Stewart et al. ................ 345/88
5,781,330 A * 7/1998 Kolodner et al. ........... 359/273
6,118,572 A * 9/2000 Kostecki et al. ............ 359/265
6,348,958 B1   2/2002 Matsuoka et al.
7,058,252 B1 * 6/2006 Woodgate et al. ............ 385/16
2002/0075420 A1   6/2002 Zhang et al.
2002/0075557 A1   6/2002 Zhang et al.
2002/0080105 A1   6/2002 Sato et al.
2002/0080301 A1   6/2002 Takahashi et al.
2002/0114557 A1   8/2002 Zhang et al.

FOREIGN PATENT DOCUMENTS

| JP | 11305222 | 11/1999 |
| WO | WO02/080290 | 10/2002 |
| WO | WO 03/015424 A1 * | 2/2003 |

* cited by examiner

*Primary Examiner*—Alexander Eisen
*Assistant Examiner*—Tammy Pham (57) ABSTRACT

A molecular light valve controlled color display. The display is formed through a layer of such molecules between a crossbar array of transparent electrodes, the crossbar intersections forming addressable pixels. A rapid sequencing of primary colors is controlled by molecular light valves congruent with display pixels. Native display resolution for a full gamut of colors is maintained for each pixel via a temporally distributed color pixel scheme. Both still and motion images can be displayed. Molecular valves, or switches, transition between two optically distinct states, e.g., transparent and black.

42 Claims, 5 Drawing Sheets

MOLECULAR LIGHT VALVE DISPLAY HAVING SEQUENCED COLOR ILLUMINATION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

The present application includes a hard copy appendix comprising pertinent specification pages and drawings of co-inventors' U.S. patent application Ser. No. 09/844,862, filed Apr. 27, 2001, by Zhang et al., for MOLECULAR MECHANICAL DEVICES WITH A BAND GAP CHANGE ACTIVATED BY AN ELECTRIC FIELD FOR OPTICAL SWITCHING APPLICATIONS as relates to subject matter claimed in accordance with the present invention.

BACKGROUND

1. Field of Technology

The present invention relates generally to methods and apparatus for distribution of information and, more specifically is related to electronically displaying content in a display with sequenced color illumination.

2. Description of Related Art

As computer appliances become smaller, more mobile, and more computational, color displays that are small, have higher pixel count, i.e., better resolution, are less expensive and more energy efficient, are highly desirable. Digital wristwatches and other miniaturized video capable appliances, telephone screens, personal digital assistant computers (PDAs), portable miniature televisions, dedicated digital video disk players (DVDs), and other small, mobile devices with resolutions in pixels-per-inch (ppi) that approach the resolution limits of the eye should become the norm.

Prior flat panel display technologies, such as liquid crystal (LCD), field emission, plasma, microcapsule, organic light-emitting diode, and the like, each have limitations, especially for color resolution and cost. In part, these limitations result from their need for color mosaic imaging, where the picture elements (pixels) in such devices are generally only capable of rendering one of the three display primary colors. Two-to-four times as many pixels are thus required in a color mosaic to be resolved in the produced image.

Prior art display technologies suffer from further limitations in addition to shortcomings in available resolution and cost. Flat panel field emission and plasma displays operate under vacuum, making their use and cost prohibitive for most low cost, mobile applications. As one example, organic light emitting diode displays suffer from poor image brightness and have comparatively limited operation lifetimes. As another example, LCDs have slow pixel response times and poor off-axis viewability. The slow pixel response times derive from the movement of 1-to-30 micron particles in a liquid cell. The typical, and resultant, 20-to-45 millisecond (ms) pixel switching times often create image trails in video imaging and in scrolling text. Smaller but faster moving particles generally will produce unacceptable image contrast. The need for polarizers in LCDs reduces display illumination efficiency and off-axis viewability.

In standard display technology, another deficiency is a tradeoff between grayscale capability—i.e., the ability to create a continuous spectrum of colors via chromaticity—hue and saturation—variation and resolution. LEDs produce spectrally narrower and calorimetrically more saturated color than the phosphors, illuminating chemistries, and organic filters used in field emission and plasma, and liquid crystal displays, respectively. The number of possible colors produced through the addition of spectrally different illuminants is proportional to the spectral narrowness of the illuminants.

BRIEF SUMMARY

The exemplary embodiments of the present invention described herein relate to displays using molecular light valves and displaying sequenced color illumination.

The foregoing summary is not intended to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS.

This application includes an Appendix having numbered drawings. In accordance with the C.F.R. double alphabetic suffixes are used in order to distinguish referenced FIGURES.

FIG. 1AA is a perspective view, schematic illustration of an exemplary embodiment of the present invention.

FIG. 1BB is a timing diagram relevant to the operation of the embodiment of FIG. 1AA.

FIG. 2AA is a schematic depiction in a magnified, perspective view of a unit of a printable, stratified, substrate having molecules in accordance with the present invention.

FIG. 2BB is a magnified detail of FIG. 2AA.

FIG. 3AA is a schematic drawing of a first method and apparatus for writing-erasing in accordance with the present invention as shown in FIGS. 1AA, 2AA and 2BB.

FIG. 4AA is a schematic drawing of a second method and apparatus for writing-erasing in accordance with the present invention as shown in FIGS. 1AA, 2AA and 2BB.

FIG. 5AA is an alternative embodiment of the present invention as illustrated by FIGS. 2AA–4AA.

FIG. 6AA is an electrical schematic diagram in accordance with the present invention.

FIG. 7AA is a schematic drawing illustrating the physics associated with the present invention as shown in FIGS. 1AA, 2AA–4AA.

FIGS. 8AA and 8BB are schematic illustrations of embodiments of a mosaic implementation of one embodiment of the present invention showing two exemplary strategies for implementation.

Like reference designations represent like features throughout the drawings. The drawings referred to in this specification should be understood as not being drawn to scale except if specifically annotated.

DETAILED DESCRIPTION

Definitions

The following terms and ideas are applicable to both the present discussion and the Appendix hereto. These definitions are to aid the reader rather than to present any new or unconventional meaning to terms of art; no limitation on the scope of the invention is intended nor should any be implied.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be for example the basis of a programmable read-only memory (PROM).

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bistable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "bimodal" for colorant molecules in accordance with the present invention may be designed to include the case of no, or low, activation barrier for fast but volatile switching. In this latter situation, bistability is not required, and the molecule is switched into one state by the electric field and relaxes back into its original state upon removal of the field; such molecules are referred to as "bimodal". In effect, these forms of the bimodal molecules are "self-erasing". In contrast, in bistable colorant molecules the colorant molecule remains latched in its state upon removal of the field (non-volatile switch), and the presence of the activation barrier in that case requires application of an opposite field to switch the molecule back to its previous state. Also, "molecular colorant" as used hereinafter as one term to describe aspects of the present invention is to be distinguished from other chemical formulations, such as dyes, which act on a molecular level.

Micron-scale dimensions refers to dimensions that range from one (1) micrometer to a few micrometers in size.

Sub-micron scale dimensions refers to dimensions that range from one (1) micrometer down to 0.05 micrometer.

Nanometer scale dimensions refers to dimensions that range from 0.1 nanometer to fifty (50) nanometers (0.05 micrometer).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

A "molecular light valve" or "optical switch," in the context of the present invention, involves reconfigurations in the electromagnetic properties of electrochromic molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electromagnetic radiation.

The term "transparency" is defined within the visible spectrum to mean that optically, light passing through the molecular system is not impeded or altered except in the region in which the system spectrally absorbs. For example, if an exemplary embodiment molecular colorant does not absorb in the visible spectrum, then the colorant will appear to have water clear transparency.

The term "omni-ambient illumination viewability" is defined herein as the viewability under any ambient illumination condition to which the eye is responsive.

As a general proposition, "media" in the context of the present invention includes any surface, whether portable or fixed, that contains or is layered with a molecular colorant or a coating containing molecular colorant in accordance with the present invention wherein "bistable" molecules are employed; for example, both a flexible sheet exhibiting all the characteristics of a piece of paper and a writable surface of an appliance (be it a refrigerator door or a computing appliance using the molecular colorant). "Display" (or "screen") in the context of the present invention includes any apparatus that employs "bimodal" molecules, but not necessarily bistable molecules. Because of the blurred line regarding where media type devices ends and display mechanisms begin, no limitation on the scope of the invention is intended nor should be implied from a designation of any particular embodiment as a "media" or as a "display."

As will become apparent from reading the Detailed Description and Appendix, "molecule" can be interpreted in accordance with the present invention to mean a solitary molecular device, e.g., an optical switch, or, depending on the context, may be a vast array of molecular-level devices, e.g., an array of individually addressable, pixel-sized, optical switches, which are in fact linked covalently as a single molecule in a self-assembling implementation, e.g., a dendrimer. Thus, it can be recognized that some molecular systems comprise a super-molecule where selective domain changes of individual molecular devices forming the system are available. The term "molecular system" as used herein refers to both solitary molecular devices used systematically, such as in a regular array pixel pattern, and molecularly linked individual devices. No limitation on the scope of the invention is intended by interchangeably using these terms nor should any be implied.

General

Figure 2:
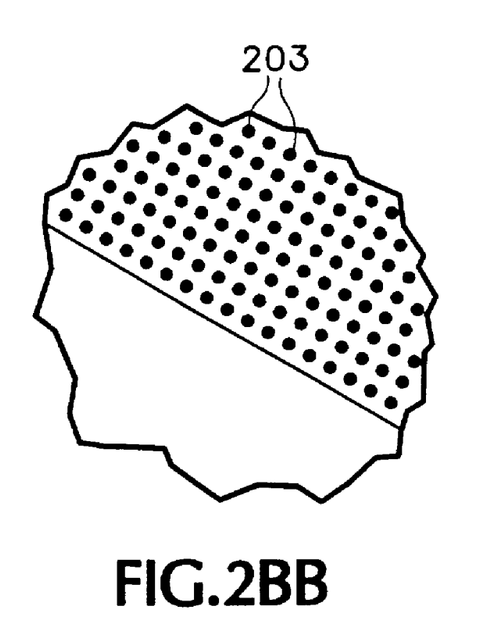

As illustrated schematically in a magnified partial view in FIG. 2AA, an electronically addressable, molecular system 200 in accordance with one embodiment of the present invention comprises an electrochromic coating 201 affixed superjacently to a substrate 202. The system 200 of the present invention employs an electrochromic molecular layer, or subsystem, 201 (phantom line illustration is used to demonstrate that the layer can in fact be transparent as described hereinafter and also to denote that the layer is very thin, e.g., from a few hundred nanometers to a few microns)

that contains electrochromic molecules 203 (represented by greatly magnified dots) that undergo conformational changes as a result of application of an electric field that in effect changes selectively localized regions of this layer from opaque. A detailed description of embodiments of the molecules 203 is provided in the Appendix hereto. In order to describe the invention, the electrochromic molecules themselves are depicted as simple dots 203 in FIG. 2BB; however, it should be recognized that there are literally millions of such molecules (in unlinked system terms) per cubic micron; this can be thought of also as millions of molecular optical switching devices per cubic micron in a linked molecular subsystem. Optionally, note that as the molecular subsystem is spatially addressable at its molecular scale, and thus the molecules may be commingled with molecules of the substrate. Incorporated substrate fabrication processes are well known in the art.

In one embodiment of the present invention described hereinafter with respect to FIGS. 1AA and 1BB, the layer 201 is used to switch predetermined regions of the layer from opaque to transparent in order to create selectively switchable light valve regions congruent with pixels of an emissive display or projector.

Bichromal Molecules, General Properties and Characteristics

In order to develop a molecular-level controlled subsystems, what is needed is a molecular system that avoids chemical oxidation and/or reduction, permits reasonably rapid switching from a first state to a second, is reversible to permit real-time or video rate writing-erasing applications, and can be adapted for use in a variety of optical devices.

The present invention introduces the capability of using molecules for optical switches, in which the molecules change optical or chromatic, or both, characteristics when changing molecular level states. This property can be used for a wide variety of write-read-erase devices or any other application enabled by a material that can change color or transform from transparent to colored. The present invention introduces several types of molecular optical property switching mechanisms: (1) an electric (E) field induced rotation of at least one rotatable section (rotor) of a molecule to change the band gap of the molecule; (2) E-field induced charge separation or re-combination of the molecule via chemical bonding change to change the band gap; (3) E-field induced band gap change via molecule folding or stretching. These devices are generically considered to be electric field devices, and are to be distinguished from electrochemical devices.

The co-pending U.S. Pat. Appl., partially incorporated herein as the Appendix, by Zhang et al. for MOLECULAR MECHANICAL DEVICES WITH A BAND GAP CHANGE ACTIVATED BY AN ELECTRIC FIELD FOR OPTICAL SWITCHING APPLICATIONS, supra, describes in detail a plurality of embodiments of bichromal molecules which can be used in accordance with the present invention.

Figure 7:
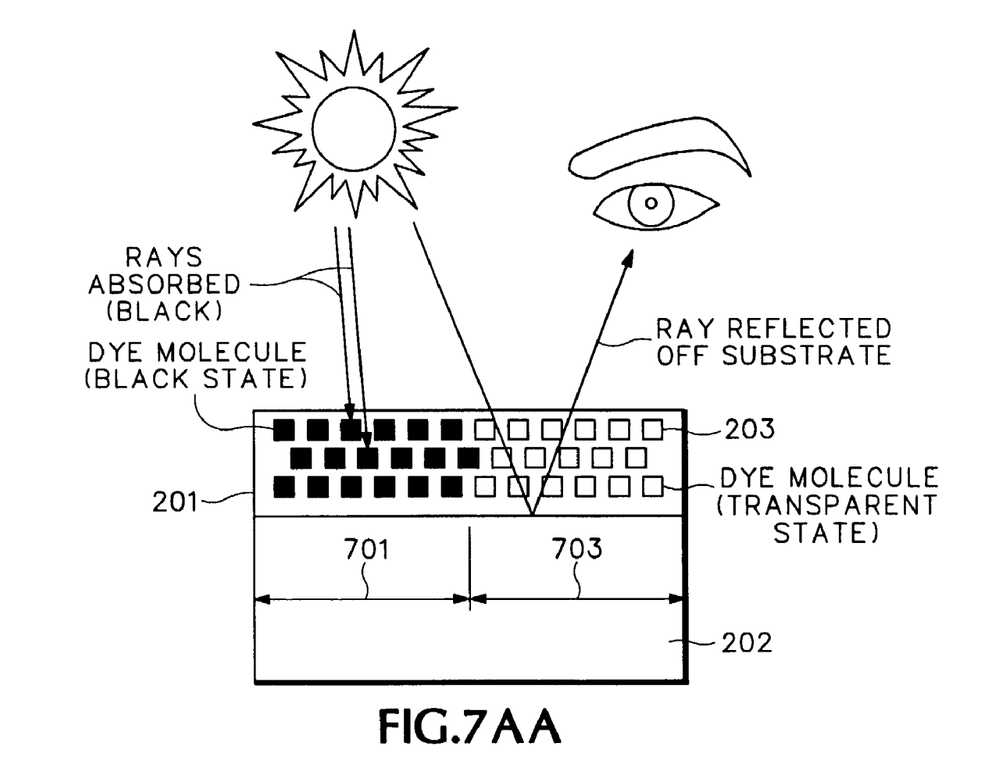

As depicted in FIG. 7AA—illustrating a stark contrast to the combined absorption-reflection physics of known, commercial, hemispheric microcapsule technology (e.g., the Xerox™ Gyricon™)—in the high color density state 701 (e.g., black), the electrochromic molecular subsystem 201 absorbs light uniformly at all light incidence angles and locations to provide conventional opaque density. In the transparent state 703 (FIG. 7AA, right side), the bichromal molecules 203 of the present invention do not absorb any visible light appreciably, allowing a substrate 202 to fully show through the coating layer 201.

Note additionally, the electrochromic molecular subsystems are spatially addressable at its molecular (Angstrom) scale, allowing far greater image resolution than with the tens-of-microns-scale of microcapsule technologies. The molecules may be bistable or bimodal. When bistable, for example in an implementation that appears to be a simple sheet of print media, a variety of printing operation solutions is available for pixel switching. While for a bistable molecular colorant in accordance with the present invention, a holding E-field via an addressable matrix of electrodes is not necessary, nonetheless such a matrix may be used, such as for flash writing-erasing the entire subsystem, then turning off the E-field to conserve power. For a bimodal, and thus self-erasing, implementation, an electrode array with a holding E-field is required. An exemplary, molecular wire adaptable for addressing pixels via a molecular subsystem is described by Kuekes et al. in U.S. Pat. No. 6,128,214 for a MOLECULAR WIRE CROSSBAR MEMORY (assigned to the common assignee herein and incorporated herein by reference).

The switching time for the electrochromic molecular subsystem designated pixel regions is significantly shorter than that for known manner microcapsule technology, allowing significantly faster imaging speeds, in the main because the electrochromic molecules are substantially stationary and change color either through the movement of electrons, the twisting of molecular elements, or both. In each case, the total mass in movement for any addressed pixel is many orders of magnitude smaller than that required with microcapsules; note also that there is additionally no viscous drag component.

Electric Field Addressable Rewritable Media Using Bichromal Colorant

Turning now again to FIGS. 2AA, 2BB, in a first embodiment the present invention comprises an electrical field addressable, rewritable media 200 using a bichromal electrochromic molecular colorant. As the colorant is active at a molecular level, it may be formed in a number of ways. Embodiments that are self-assembling, formed using impregnation, or a coating with a liquid, paint, ink, or as an otherwise adapted form liquid vehicle on a substrate 202, are all within the scope of the invention. The molecular colorant may be a self-assembling system or have a carrier or vehicle for applying the colorant to a substrate using conventional deposition and drying (or curing) techniques. The various types of vehicles are discussed in more detail hereinbelow.

The present media 200 invention contemplates a wide variety of substrate 202 materials and forms. As merely one example directed toward printer and plain paper-like application uses, the coating 201 may be affixed onto a plastic or other flexible, durable, material substrate 202 in the approximate size, thickness, and shape of commercial stationery or other printable media (see also, U.S. Pat. No. 5,866,284 by Kent D. Vincent, filed on May 28, 1997, for a PRINT METHOD AND APPARATUS FOR RE-WRITABLE MEDIUM; see also U.S. patent application Ser. No. 10/021446 also by Vincent et al. for LASER PRINTING WITH REWRITABLE MEDIA). The particular substrate 202 composition implemented is fully dependent on the specific application and, particularly, to the role that the substrate plays in supporting or creating the electric field that is imposed across the coating 201 layer. In fact, the molecular coating, at least in a bistable molecular system form, can be used with any surface upon which writing or images can be formed. While this provides on exemplary implementation, it should be noted that a variety of flat panel and projection display systems using appropriate substrate materials, e.g., for computer and television screens and the like, can also be implemented.

The Molecular System Erasably Writable Surface

In another embodiment related to the present invention, a coating layer 201 of the subsystem 200 comprises electrochromic molecules 203 (FIGS. 2AA–2BB)—self-assembling or molecules in association with another chemical component, the "vehicle"—having an electrical field responsive high color density state and a transparent state. The vehicle may include binders, solvents, flow additives, or other common coating additives appropriate for a given implementation.

Preferably, the pixel regions of the coating layers 201 obtain a first state—e.g., black—when subjected to a first electrical field and a transparent state when subjected to a second electrical field. The coating 201—or more specifically, the addressable pixel regions—in a preferred embodiment is bistable; in other words, once set or written, the field targeted molecules form the "light valve closed" state, remaining so until the second field is applied, returning the molecules to their transparent state, "light valve open," at the field targeted pixels. Again, it must be recognized that there may be millions of such switched molecule in any given pixel.

Although very different in constitution, the coating composition of this invention is analogous to conventional coating formulation technology. The constituents of the molecular light valve subsystem will depend on the rheology and adhesion needs of the printing/coating process and substrate material. In some implementations, the subsystem strata will be self-assembling. Typically, the coating 201 layer will compose 1%–30% of the solid content of the film deposited to form the coating 201 layer on the substrate 202. The coating 201 may include a polymeric binder to produce a dried or cured coating 201 layer on the substrate 202 in which the electrochromic molecular subsystem is suspended. Alternatively, the solids content may include as much as 100% of the subsystem constituency for certain known manner evaporative deposition methods or other thin film deposition methods wherein the molecular light valve layer 201, or an associated vehicle, is deposited. In the case of deposition-evaporation methods, there may be no associated vehicle. In some instances, the layer 201 must be pre-oriented within the deposited coating layer to allow an optimum alignment with the electrical field that will be used to open and closed addressed pixel regions. Such orientation may be achieved by solidifying the deposited coating 201 layer under the influence of a simultaneously applied electric field across the construct 200. In one specific embodiment, the coating 201 comprises electrochromic molecular colorant and a liquid, ultraviolet light ("UV") curable, prepolymer (e.g., (meth)acrylate or vinyl monomers/oligomers). The polymer in this instance is formed in situ on the substrate 202 when subjected to ultraviolet radiation. Such prepolymers are well known in the coatings art.

In a second specific embodiment, coating solidification may occur through thermally activated vehicle chemical reaction common to epoxy, urethane, and thermal free radical activated polymerization.

In a third specific embodiment, coating solidification may occur through partial or total vehicle evaporation.

The subsystem layer 201 may also self-orient through coating design that allows a self-assembled lattice structure, wherein each monomer aligns with adjacent monomers. Such design and lattice structures, for example, are common to dendrimers and crystals. Processes for self-assembly may include sequential monolayer deposition methods, such as well known Langumir film and gas phase deposition techniques.

The Substrate

Figure 3:
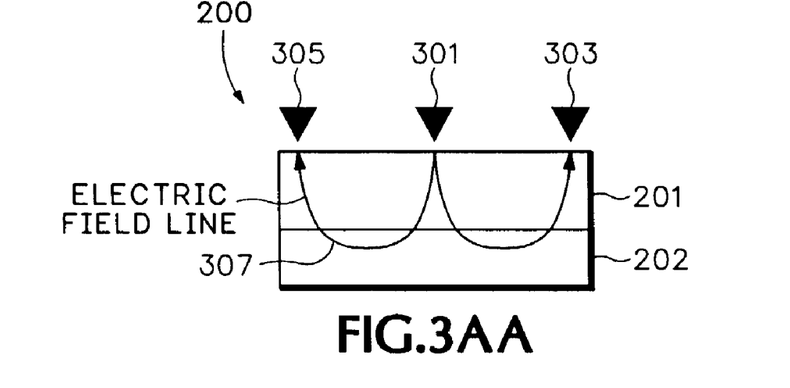
Figure 4:
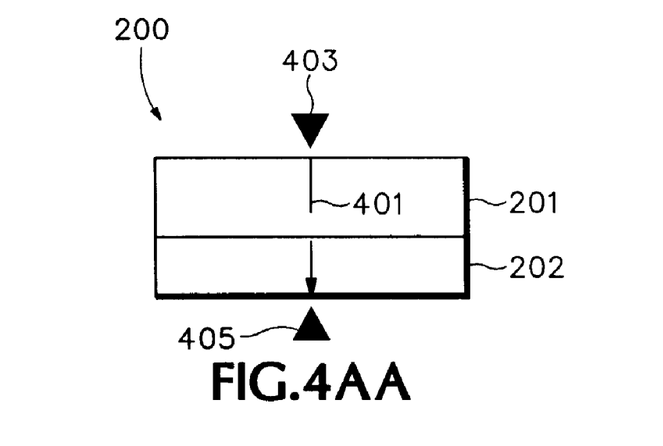
Figure 5:
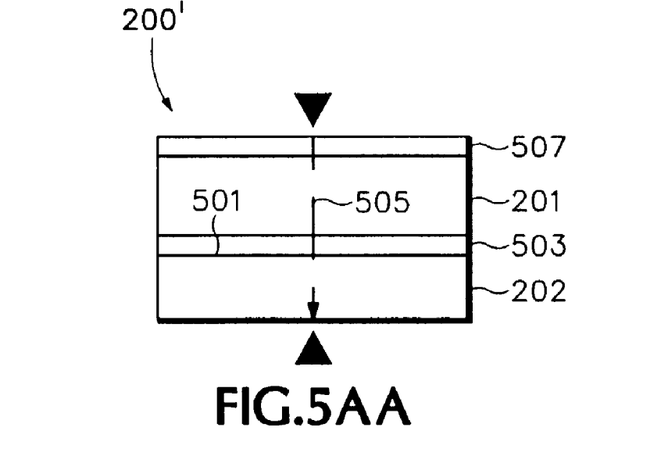

The construction of any specific implementation of the subsystem may be dependent upon the writing means, such as are schematically represented in FIGS. 3AA, 4AA, and 5AA, described in more detail hereinafter. For implementations using an electric field that is perpendicular to the surface of the subsystem (see e.g., FIG. 4AA and 5AA, the substrate 202 should be fabricated of a material having a dielectric constant and electrical conductivity which compliments that of the coating 201 layer. Overall, the substrate may be flexible, semi-flexible, or rigid. It may comprise structures as a film, foil, sheet, fabric, or a more substantial, preformed, three-dimensional object. It may be electrically conductive, semi-conductive, or insulative as appropriate for the particular implementation. Likewise, the substrate may be optically transparent, translucent or opaque, or colored or uncolored, as appropriate for the particular implementation. Suitable substrate materials for one-side electrode implementations such as demonstrated by FIG. 3AA may be composed, for example, of paper, plastic, metal, glass, rubber, ceramic, wood, synthetic and organic fibers, and combinations thereof. Suitable flexible sheet materials are preferably durable for repeated imaging, including for example resin impregnated papers (e.g. Appleton Papers Master Flex™), synthetic fiber sheets (e.g., DuPontt™ Tyvex™), plastic films (e.g., DuPont Mylar™, General Electric™ Lexan™, and the like) elastomeric films (e.g., neoprene rubber, polyurethane, and the like), woven fabrics (e.g., cotton, rayon, acrylic, glass, metal, ceramic fibers, and the like), and metal foils. Suitable substrate materials for two-sided electrode applications as shown in FIGS. 4AA and 5AA may be composed from the same materials wherein it is preferable that the substrate be conductive or semi-conductive, have a conductive layer in near contact with the molecular layer 201, or have a high dielectric constant bulk property to minimize voltage drop across the substrate. Conductive substrates include metals, highly conjugated conductive polymers, ionic polymers, salt and carbon filled plastics and elastomers, and the like. Suitable semi-conductive substrates may be composed of conventional doped silicon and the like. Substrates with a conductive layer include metal clad printed circuit board, indium tin oxide coated glass, ceramics, and the like. Vapor deposited or grown semiconductor films on glass, ceramic, metal or other substrate material may also be used. Each of these substrates are commercially available. High dielectric constant materials include metal-oxide ceramics such as titania. Suitable substrates may be composed of sintered ceramic forms, woven ceramic fabric, or ceramic filled plastics, elastomers and papers (via ceramic-resin impregnation). Translucent substrates may be used in applications where ambient illumination and backlit viewing options are made available on the same substrate. In general, it is desirable that the translucent substrate appear relatively opaque white under ambient viewing conditions and transparent white under backlit viewing conditions. Suitable translucent substrates include crystalline and semi-crystalline plastic, fiber sheets and film (e.g., Dupont Tyvex), matte-surfaced plastic films (e.g., DuPont matte-finish Mylar and General Electric matte-finish Lexan), commercial matte-surfaced glass, and the like.

A Molecular Light Valve Embodiment

In a basic embodiment, the present concept allows a single field switchable molecular colorant molecule, preferably between black and transparent or white and transparent, to provide color switching for multiple display pixel colors, e.g., the primary additive colors—red, blue, green—or the primary subtractive colors—cyan, magenta, yellow—and black. Black and white switchable molecular colorants either absorb or scatter, respectively, virtually all incident visible light in a first switch state and transmit virtually all incident light in a second switch state where the molecule is transparent. In other words, the molecule for this embodiment does not need to provide a specific spectral absorption profile characteristic of any specific color. A matrix of single field switchable molecular black/transparent or white/transparent stateable molecules acts as a light valve in a coating layer that is situated to be optically adjacent to a color mosaic filter or color mosaic print of non-switchable colors. The color mosaic is a repetitious pattern of pixels wherein each pixel has, for example, a cyan, magenta, yellow, and black subpixel element.

Figure 8:
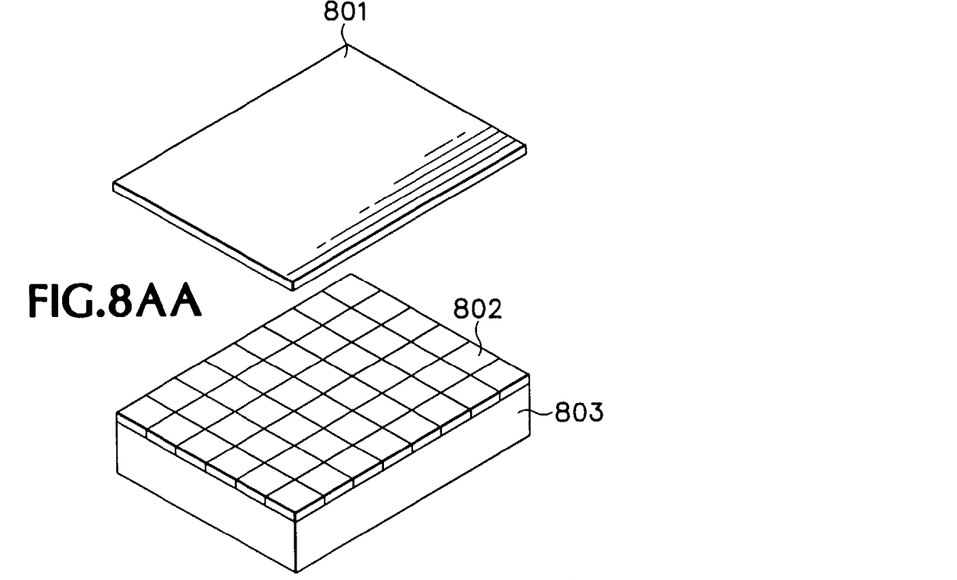

Turning now to FIGS. 8AA and 8BB, two adjacent imaging layers 801, 802 or 804, 805, respectively, are provided on a substrate 803. The molecular light valve construct, layer 801 of FIG. 8AA, is substantially identical to layer 201 described with respect to FIG. 7 hereinbefore and the accompanying technology description of this Detailed Description section and the Appendix. In FIG. 8AA, the molecules 203 of valve layer 801 are selectively switchable between black and transparent states. In FIG. 8BB, the molecules 203 of valve layer 805 are selectively switchable between white and transparent states.

A mosaic color imaging layer 802, 804 includes, but is not limited to, a regular pattern of color pixels at a predetermined resolution, e.g., 1200 pixels per inch ("ppi"); preferably, in other words, a resolution greater than that for average human visual dot discrimination ability. A mosaic color imaging layer 802 that is printed on, or otherwise mounted on, a substrate 803 to be subjacent the molecular valve layer 801 may be a mosaic pattern formed by a printed mosaic color pattern, thus acting as background for the black-transparent molecular valving layer 801 as shown in FIG. 8AA. The mosaic pattern may be formed conventionally such as by printing with pigment, dye, or combined pigment and dye. Thus, no color shows through with the molecular light valves in the black switch state and color shows through in the transparent switch state.

The use of conventional mosaic filters as shown in FIG. 8BB is in accordance with the known manner, conventional technology for single sensor video cameras, flat panel displays, and the like. Likewise the use of a conventional color filter (e.g., as used in color LCD screens) for backlit or projection displaying of an image can be implemented; the back-transparent colorant molecules serves as a light valve similar to liquid crystal shutters. The benefit of each of these approaches is that it uses a single molecular colorant with conventional mosaic colorant (ink, filters). The color mosaic filter may optionally be printed as a background layer on a protective, transparent substrate (e.g., glass). These approaches allow full color without inherent color, switched molecules (e.g., yellow/transparent state, and the like).

In operation, the molecular valve layer 801, 805 is selectively switched in a pixel-wise fashion from a black or white state to a transparent state via electric fields applied (see e.g., FIG. 3AA, 4AA, 5AA and the above description; or aforementioned Kuekes patent). The color of any given pixel on the image layer 802, 804 is optically transmitted in those pixel areas where the valve layer 801, 805 is made transparent. The adjacent color is elsewhere blocked by the black state of the molecular light valves. Preferably, the default switch state for the embodiment of FIG. 8AA is black, so that the device will present a CRT appearance; in other words, the display will appear black except where color pixels are otherwise reflecting light. For the embodiment of FIG. 8BB, the default switch state is white, so that the device will present an appearance of a sheet of white paper; in other words, the displayed image will appear white except where color pixels are otherwise visible through those molecular valves in the transparent state.

In still another implementation, where a background light source is provided as part of the substrate 303 to make a emitted light projection display, the molecular valve layer 801, 805 preferably would use black-transparent stateable molecules, cutting off the rear-projected light from pixels that are not to be illuminated.

This molecular light valve embodiment can also take advantage of the use of bistable molecules whereby the electric field can be turned off after image forming, conserving device energy.

Importantly, because the colorant molecules can be implemented in an embodiment having a transparent state, colorant strata can be layered (e.g., molecules switching between transparent and primary colors in separate strata layers) such that very high resolution, full color rendering can be accomplished through multi-color layer pixel superposition (e.g., overlays of the subtractive primary colors cyan, magenta and yellow); only in the present invention such implementations will be in fully rewritable formats.

Figure 6:
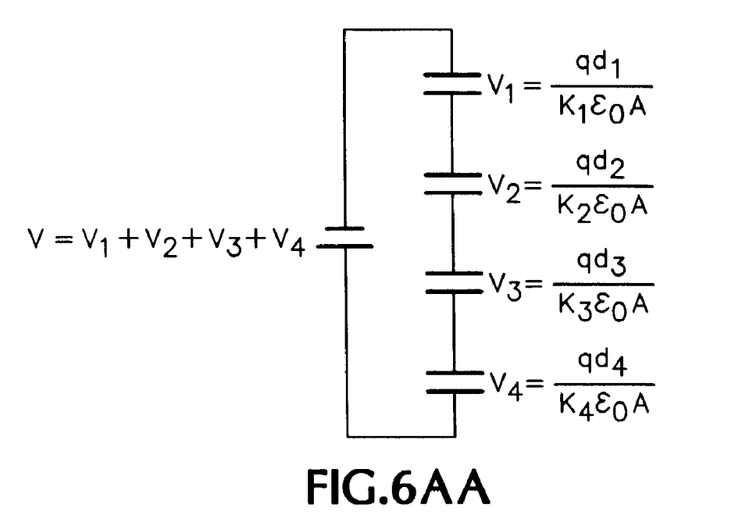

The thickness and dielectric constant of each coating, layer and substrate component comprising the media 200, 200' of this invention is preferably selected to accommodate the spacing of opposing electrodes, field geometry, and voltage used to switch a given media pixel. The pixel resolution, as measured in pixels per linear dimension (e.g., 1200 pixels/inch ("ppi") for color, 4800 ppi for grey scale), is inversely proportional to the electrode spacing. The pixel switching voltage for the embodiment as shown in FIG. 5AA is equivalent to the sum of voltage drops over the respective layers that interpose the opposing electrodes. This is represented by the electrical schematic of FIG. 6AA. Each layer introduces a series capacitance with a voltage drop, "$V_n$," proportional to the layer thickness ("$d_n$") and inversely proportional to the layer dielectric constant ("$k_n$"), where "q"=the electronic charge (Coulombs) accumulated at an electrode, "$\epsilon$"=the permitivity constant, and "A"=coating layer surface area subjected to the field.

The substrate 202 generally represents a significant voltage drop and source for electrical field broadening if included within the electrode field. Thus, the substrate 202 is preferably a conductive material, thereby making an effective common ground plane electrode in applications such as FIGS. 4AA and 5AA that require the substrate to lie within the writing electric field. Metals and conductive and ionic polymers are good material choices in such instances. Alternatively, the substrate 202 may be composed of a high dielectric material to offset the voltage loss in an embodiment represented schematically by FIG. 4AA. Titania, or a like high dielectric filler, impregnated polymers, fiber-based papers, and plastics may be used for this purpose. Many applications for uses of the embodiment using a molecular light valve can be envisioned. Some exemplary uses are as: electronic paper, electronic books and the like reading materials, computer displays, television, projectors and projection screens, electronic billboards, electronic wallpaper, windowglass displays, multi-spectral optical communication light modulators (e.g., for ultra high bandwidth communications), electronic pictures and photographs, electronic fabrics, and the like.

A Specific Embodiment for Sequenced Color Illumination

Figure 1:
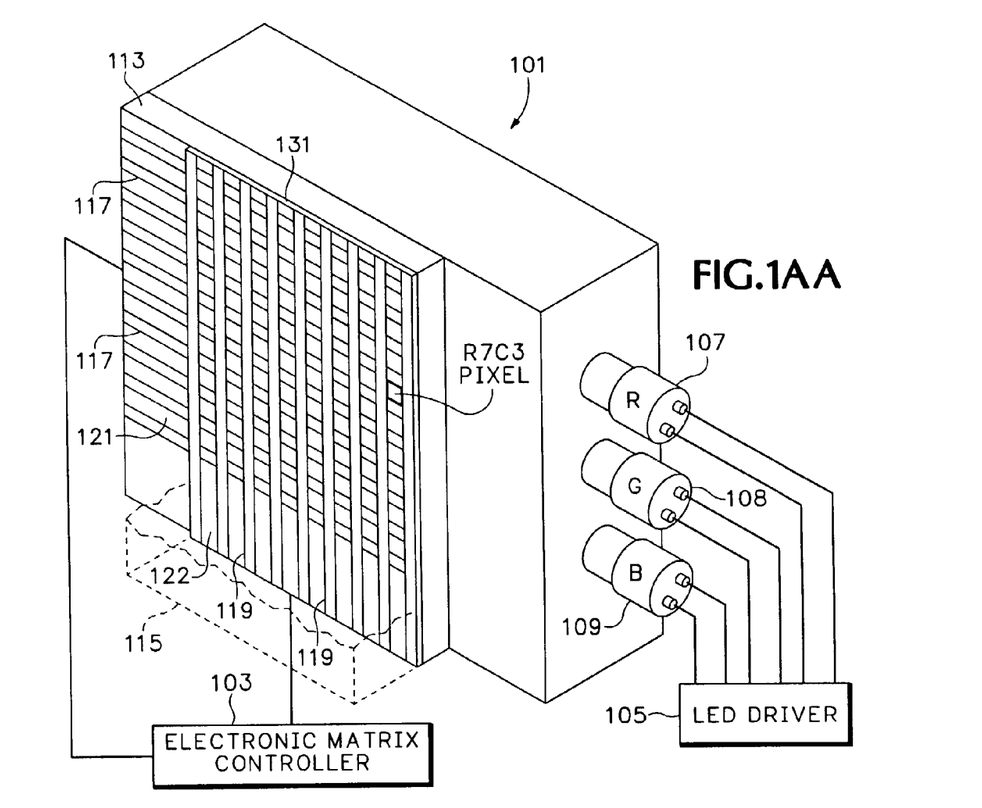

FIG. 1AA schematically illustrates an exemplary embodiment of an apparatus 101 in accordance with the present invention. Standard state-of-the art electronics 103, 105 are provided for controlling various components of the apparatus 101 as described hereinafter.

The apparatus 101 includes three primary color light emitters, or generically "illuminants," exemplified by a red (R) light emitting diode 107, a green (G) light emitting diode 108, and a blue (B) light emitting diode 109. LED driver electronics 105 controls light emission using standard, known manner, state-of-the-art techniques.

The apparatus 101 includes a light distributor 111 for receiving and distributing the emissions from the LEDs 107, 108, 109. Light distributors and diffusers are well known commercially (see e.g., U.S. Pat. No. 4,139,259 (Kersten et al.) filed Jan. 12, 1976, or U.S. Pat. No. 4,282,560 (Kringel et al.), filed Jan. 15, 1979). In general, the light distributor 111 collects, guides, and substantially uniformly distributes light emitted by each of the sources 107, 108, 109 onto the associated surface of the molecular light valve array, in this embodiment, via an electrode substrate 113, described below.

Note that while this exemplary embodiment shows three individual LEDs, one skilled in the art will recognize that direct incorporation of LED chips within a light distributor may lead to a smaller and more economical display package. Likewise, the illumination may alternatively be provided through multiple illuminants of each primary color for greater light intensity.

The apparatus has a first electrode substrate 113 and a second electrode substrate 115, which is shown in phantom line and cut-away form for convenience in order to better illustrate the internal electrode and pixel structure of the apparatus 101. The substrates 113, 115 may be of glass or some other clear film. A matrix of electrodes is formed using the substrates 113, 115. Transparent horizontal electrodes 117 and vertical electrodes 119 (only one each of the series forming the whole matrix array is numbered) are each formed on a respective transparent substrate 113, 115. The electrodes 117, 119 et seq. themselves, and electrodes connector pads 121, 122, et seq. respectively, are also transparent, consisting for example as a vapor deposited layer of metal, or metal oxide such as indium-tin-oxide (ITO), are etched to form the respective horizontal electrodes 117 and vertical electrodes 119. The pads 121, 122 et seq. connect the electrode array matrix formed by the electrodes 117, 119 et seq. to a known manner, state-of-the-art matrix controller 103. Each intersection of a vertical electrode 119 with a horizontal electrode 117 forms a selectively addressable "pixel R7C3" (Row and Column), so-labeled.

Note it is also envisioned that thin film transistors (TFT) may be formed at pixel locations along the electrodes for active matrix addressing. TFT and active matrix technology applicable to the present invention is well known in the art and heavily commercialized in LCD apparatus.

Between the electrodes 117, 119 et seq. and respective substrates 113, 115, is a molecular light valve layer 131. This molecular light valve layer 131 is analogous to layer, or coating, 201 in FIGS. 2AA and 2BB or layer 801, 805 of FIGS. 8AA and 8BB, respectively. The molecular light valve layer 131 may be coated onto the electrode surface of one of the electrode substrates 113, 115, or may be a separate strata sandwiched by each substrate. In manufacturing, the electrode surface of the other electrode substrate is subsequently mated to the exposed surface of the molecular light valve layer 131, thereby forming a stratified molecular light valve controlled pixel array. In other words, there is an addressable pixel array formed by sandwiching the molecular light valve layer 131 between two layers of transparent electrodes 117, 119 et seq. The active molecules of the molecular light valve layer 131 are reconfigurable, specifically switching between a transparent state—"light valve open"—and an opaque state, e.g., black—"light valve closed." The pixel control can be thought of as switching individual molecules of a pixel simultaneously or as switching an entire molecular subsystem comprising millions of molecules of the pixel to open and close the light valve. Note that other two state embodiments may be implemented in accordance with the Appendix description.

It should be understood that this FIG. 1AA is not to be interpreted as anywhere near the scale of resolution potential of the display. The pixels-per-inch are to be distributed generally at or greater than that which can be resolved by human vision. In fact, by using a molecular wire concept, such as disclosed by Keukes, supra, the ppi of the apparatus 101 has virtually no limit since control is performed at the molecular scale; the smaller the pixel, the smaller the required electrical field to cause the state change of the molecules of the light valve of that pixel. In the current state of the art, the limitation to miniaturization would seem to be at the control pads which may be limited to the latest semiconductor fabrication techniques to achieve the smallest possible size in appropriate relation to the pixel resolution of the display.

In the main, the molecular light valve layer 131 at each pixel RnCn is absorptive of light and appears black in the absence of any electric field applied across the layer. Note the optical state and voltage response may be reversed for opening or closing the molecular light valves. Pixels of the electrode sandwich become transparent when an appropriate voltage is applied across the layer 131 through the selectively addressed corresponding electrodes 117, 119 et seq. The LEDs 107, 108, 109 selectively and uniformly illuminate the backside of the molecular light valve layer 131 via the light distributor 111.

Light is allowed to pass through each transparent state pixel to the observer or is blocked by each opaque state pixel. An image is formed. Still image content—e.g., analogous to a controlled slide show—or motion picture image content can be generated from digital data representative of the images. Known manner, video technology, scanned sequencing, creates video images in the same manner as standard television apparatus. The drive scheme for opening and closing molecular light valves is applied to each pixel within the molecular light valve array, sequentially or in parallel as needed; this is described in further detail below with respect to FIG. 1BB. For each illumination interval, an array of color transmission periods are computed and used to drive each respective pixel for the given color. The incoming imaging signal must thereby be separated into primary color pixel values for each video frame, then converted to individual color transmission periods for each pixel using grayscale conversion ratios, described hereinafter. The conversion is strictly algebraic, and drive circuits to make such conversions and to drive the apparatus 101 are well known to those skilled in the art of video display drive circuitry.

In an alternative embodiment, a display front surface distributor is employed. The switchable molecular light valve layer, e.g., FIG. 1AA, element 131, is coated onto a white, or otherwise reflective surface, for example the horizontal vertical electrode layer 117, rather than a transparent surface. For pixels in the valve-closed state, incident light from the distributor 111 is absorbed. For pixels in the valve-open state, incident light from the distributor 111 is reflected. Note that the distributor itself has to be modified for emitting the now reflected illumination, viz., a front lit screen. Since sequential color illumination is used the reflected light is the same as the transmitted light in the backlit embodiment previously described herein, modulated in the same manner.

Operation of the apparatus is now explained referring to both FIGS. 1AA and 1BB, a timing diagram. In contrast to spatially distributed mosaic color pixels of prior art display technologies, the present invention maintains native display resolution through a temporally distributed color pixel scheme. The color image by each pixel RnCn within the apparatus 101 is produced through a rapid sequencing of primary colors through the molecular light valve associated with each pixel and three sequentially illuminated primary color light sources. The term "molecular light valve" is now used in the singular as it can be recognized that each pixel is in itself comprises a molecular subsystem that is reconfigurable between a transparent state—open—and an opaque state—closed.

For example, a standard 33 ms video pixel image—30 frames per second (fps)—may be produced from the digital data representative of an image frame as the temporal composite of three sequential 11 ms distributions of RGB tristimulus color space components of the desired pixel color. The light valve transmission time for each primary may be made a fraction of its allotted time for producing full grayscale color imaging. This temporal light distribution scheme takes advantage of the persistence function of the eye and brain, which integrates the time and intensity of the three pixel components perceptually into the desired single composite grayscale picture color. The array of pixels composing the display is accordingly addressed through sequential color planes, three sequential color planes forming a single composite image video frame. Note that a specific implementation may select one or more addressing variations, including grayscale planes—an integer multiple of three planes per frame. Note also that the infinitesimal inertia and rotation resistance imposed by the molecular level switching allows light valve reconfiguration switching times on the order of $10^{-9}$ second, one nanosecond, allowing distribution schemes limited only by the speed of the associated electronic control packages 103, 105.

FIG. 1BB is a timing diagram for the sequential and cyclical illumination of the RGB LEDs 107, 108, 109 in concert with each molecular light valve associated with a given pixel RnCn. Over a period of each successive video frame, the RGB LEDs 107, 108, 109 are individually illuminated, "I," in sequence over nominally equal time intervals, "$t_R$, $t_G$, $t_B$," respectively. For this embodiment, the sum of these illumination intervals is nominally equal to the video frame period, 33 ms for 30 fps. During each of these illumination time intervals, the pixel light valves for the addressed pixels to transmit the illumination are made transmissive, "T", i.e., the valves are transparent, for an associated color transmission period "tr, $t_g$, $t_b$," respectively, then returned to the black or light blocking state "B." The color transmission period may include none, all, or an intermediate fraction of the illumination period for each color. Thus, for a given video frame, an open-valve pixel transmits red color light by $t_r$, $t_g$-second of green light, and $t_b$-second of blue light.

The pixel is perceived, for example, as full white when the color transmission periods equal the full illumination intervals and the RGB intensity levels are appropriately balanced. The desired white value may be set by adjusting the illumination intervals and LED intensities via the driver 105. The pixel is perceived as black when each of the color transmission periods is zero. Within this luminance range, linear color grayscales may be computed through the ratio of the color transmission periods and illumination intervals, that is "$t_r/t_R$," "$t_g/t_G$," and "$t_b/t_B$." The number of gray levels attainable is dependent upon available switching speed as determined primarily by circuit impedance in the light valve and controller 103 circuitry. Through the persistence function of human vision, the sequentially transmitted colors are time and intensity integrated into a single perceptual color value for the pixel. Thus, a temporal display analog to tristimulus color space used in printing is established.

Note also that with respect to FIG. 1BB, because of the ability to rapidly open and close the molecular valves; in one "video frame" there may also be several valve state changes and transmission periods per pixel per color illumination. For example, color transmission periods may be subdivided; there may be many more than one $t_r$ valve T-states and B-states during each $t_R$. The three illumination intervals, $t_R$, $t_G$, $t_B$, may be subdivided and multiply interleaved, e.g., a "video frame" being $t_R/2$, $t_G/2$, $t_B/2$, $t_R/2$, $t_G/2$, $t_B/2$. Other combinations for temporally tuning each pixel can be implemented. Moreover, the luminance—brightness—of each pixel is also controllable via the molecular valves of each pixel; e.g., when displaying LED red only, the duration of the valve T-state may control luminance rather than of those pixels.

A display in accordance with the present invention is capable of producing a greater number of colors within the visual color space than prior art display devices. Millions of hues can be generated, allowing improved calorimetric image accuracy.

Note that the present invention may be optionally configured as a projection apparatus simply by using the molecular valves as projection shutters for intense projection illuminants feeding the light distributor.

While the exemplary embodiment of FIG. 1AA has been described with three sequenced illuminants, this is not to be considered a limitation to the invention. More than three different colors, illuminant intensities, or combinations may also be used. The number of illumination intervals and color transmission periods may likewise increase to reflect the number of illuminant colors and intensities sequenced. Likewise, other illuminants capable of sequencing colors are also applicable, e.g., white light, color wheel, fluorescent, and the like, or filter sets with in-line valves, including molecular light valves described herein, sequenced to produce the sequence of visible illumination desired.

Costs of displays may be substantially reduced without tradeoff of resolution. Apparatus is inherently simpler in construction because no vacuum or liquid to seal and no color pattern to incorporate is required. Throughput loss is reduced compared to polarized LCD equipment; off-axis viewability is improved.

Thus, there is provided a molecular light valve controlled high definition display, using sequenced color illumination and light valve modulation circuitry, allowing full color gamut rendering by each pixel in the display.

The foregoing description of embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment(s) chosen are to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . "

What is claimed is:

1. An electro-optical color display device having a plurality of picture elements wherein each of said picture elements comprises:
   a pair of transparent electrodes arranged to form an addressable cell; and
   a molecular light valve associated with said electrodes such that each intersection of said electrodes is one of said picture elements of said display device wherein light distributed to said valve is selectively blocked or transmitted therethrough using said electrodes for controlling the electrochromic state of said valve.

2. The invention as set forth in claim 1, the molecular light valve further comprising:
   a plurality of molecules forming a subsystem wherein each of said molecules has a predetermined, substantially identical, electrochromic reconfigurability characteristic.

3. The invention as set forth in claim 2 comprising:
   said molecules exhibit an electric field induced band gap change.

4. The invention as set forth in claim 3 comprising:
   said electric field induced band gap change occurs via a mechanism selected from a group including (1) molecular conformation change or an isomerization, (2) change of extended conjugation via chemical bonding change to change the band gap, and (3) molecular folding or stretching.

5. The invention as set forth in claim 3 comprising:
   said electric field induced band gap change occurs via a molecular conformation change or an isomerization.

6. The invention as set forth in claim 5 wherein the molecules forming the molecular system further comprise:
   at least one stator portion and at least one rotor portion, wherein said rotor rotates from a first state to a second state with an applied electric field, wherein in said first state, there is extended conjugation throughout said molecular system, resulting in a relatively smaller band gap, and wherein in said second state, said extended conjugation is destroyed, resulting in a relatively larger band gap.

7. The invention as set forth in claim 5 comprising:
   dependent upon direction of electrical field applied, in a first of said states said molecules are in a more conjugated state having a relatively smaller band gap, and in a second of said states said colorant molecules are in a less conjugated state, having a relatively larger band gap.

8. The invention as set forth in claim 3 comprising:
   said electric field induced band gap change occurs via a change of extended conjugation via chemical bonding change to change the band gap.

9. The invention as set forth in claim 8 comprising:
   said electric field induced band gap change occurs via a change of extended conjugation via charge separation or recombination accompanied by increasing or decreasing band localization.

10. The invention as set forth in claim 9 comprising:
    a change from a first state to a second state occurs with an applied electric field, said change involving charge separation in changing from said first state to said second state, resulting in a relatively larger band gap state, with less Π-delocalization, and recombination of charge in changing from said second state to said first state, resulting in a relatively smaller band gap state, with greater Π-delocalization.

11. The invention as set forth in claim 8 comprising:
    said electric field induced band gap change occurs via a change of extended conjugation via charge separation or recombination and Π-bond breaking or formation.

12. The invention as set forth in claim 11 comprising:
    a change from a first state to a second state occurs with an applied electric field, said change involving charge separation in changing from said first state to said second state, wherein in said first state there is extended conjugation throughout, resulting in a relatively larger band gap state, and wherein in said second state said extended conjugation is destroyed and separated positive and negative charges are created, resulting in a relatively smaller band gap state.

13. The invention as set forth in claim 3 comprising:
    said electric field induced band gap change occurs via a molecular folding or stretching.

14. The invention as set forth in claim 13 comprising:
    said colorant has three portions, a first portion and a third portion, each bonded to a second, central portion, wherein a change from a first state to a second state occurs with an applied electric field, said change involving a folding or stretching about of said second portion, wherein in said first state there is extended conjugation, resulting in a relatively smaller band gap state, and wherein in said second state, said extended conjugation is destroyed, resulting in a relatively larger band gap.

15. The invention as set forth in claim 2 comprising:
    said molecules have a low activation barrier between different said states providing a fast volatile switch.

16. The invention as set forth in claim 2 comprising:
    said subsystem is configured for switching selected picture elements between primary color states.

17. The invention as set forth in claim 2 comprising:
    said molecules are bimodal.

18. The invention as set forth in claim 2 wherein said molecules are arranged to form a discrete, addressable picture element of a video display surface.

19. The invention as set forth in claim 1 forming one addressable cell of a video display screen having a plurality of said cells and sequenced color illumination therethrough.

20. The invention as set forth in claim 1 wherein said molecular light valve further comprises:
a dendrimer layer.

21. A display apparatus comprising:
a first stratum forming a plurality of transparent first electrodes in a predetermined first arrangement;
a second stratum forming a plurality of transparent second electrodes in a predetermined second arrangement wherein said first arrangement and said second arrangement form an addressable array, wherein each intersection of said first electrodes and said second electrodes forms a picture element of said display apparatus;
sandwiched by said first stratum and said second stratum, a third stratum comprising a molecular light valve layer wherein molecules thereof are electrochromic and adapted for switching between an open state and a closed state via addressing signals through said array;
associated with one of said first stratum or said second stratum, a light distributor; and
coupled to said light distributor, selectively sequenceable color light sources.

22. The apparatus as set forth in claim 21 wherein each picture element is sequentially and cyclically illuminated from said distributor in conjunction with switching said molecules at each said picture element for producing a predetermined single perceptual color value thereat.

23. The apparatus as set forth in claim 21 each of said molecular light valve layer comprising:
a matrix of light valves contiguous with each said picture element, wherein each of said valves is a molecular subsystem wherein each of said molecules has a predetermined, substantially identical, electrochromic reconfigurability characteristic.

24. The apparatus as set forth in claim 23 comprising:
said molecules exhibit an electric field induced band gap change.

25. The apparatus as set forth in claim 24 comprising:
said electric field induced band gap change occurs via a mechanism selected from a group including (1) molecular conformation change or an isomerization, (2) change of extended conjugation via chemical bonding change to change the band gap, and (3) molecular folding or stretching.

26. A method of displaying video images, the method comprising:
providing a display screen having picture elements controlled by a molecular light valves;
transmitting at least three primary color light pulses at a video frame rate to a light distributor associated with a display screen;
sequencing said molecular light valves between an open state and a closed state sequentially and cyclically in coordination with said light pulses such that a single perceptual color value is displayed at each of said picture elements to form said video images.

27. The method as set forth in claim 26 comprising:
said sequencing is a temporal composite of three sequential timed distributions tristimulus color space components of a desired pixel color.

28. The method as set forth in claim 26 for displaying still image content.

29. The method as set forth in claim 26 for displaying moving image content.

30. The method as set forth in claim 26 wherein in one video frame time period there are several valve state changes and color transmission periods per pixel per color illumination.

31. The method as set forth in claim 30 wherein the color transmission periods are subdivided for at least one illumination period.

32. The method as set forth in claim 30 wherein each said color illumination is subdivided and multiply interleaved.

33. The method as set forth in claim 30 wherein luminance of each pixel is controlled via timing the molecular valve open state.

34. The method as set forth in claim 30 wherein light valve light transmission time for each primary color transmitted is made a fraction of allotted time therefor and producing grayscale color imaging thereby.

35. A display comprising:
transparent electrode means for forming an addressable pixel array; and
at each intersection of the electrode means, a molecular light valve means for opening and closing each pixel, wherein said electrodes selectively emit fields for reconfiguring optical states of molecules of said valve means between an open state for transmitting light and a closed state for blocking light.

36. The display as set forth in claim 35 further comprising:
illuminant means for sending said light to said valve means.

37. The display as set forth in claim 36 comprising:
timing means for addressably controlling said electrode means and said illuminant means.

38. The display as set forth in claim 37 wherein said timing means is controlled and generates a temporally distributed color pixel scheme via said valve means.

39. A method for fabricating a display, the method comprising:
forming a first transparent electrode set having a first orientation;
forming a second transparent electrode set having a second configuration such that when aligned with said first transparent electrode set an addressable matrix is formed; and
separating said first transparent electrode set and second transparent electrode set with a molecular light valve stratum such that each electrode intersection in said matrix forms a pixel having a valve controlled open state and a valve controlled closed state.

40. The method as set forth in claim 39 wherein the stratum further comprises a plurality of molecules forming a valving subsystem wherein each of said molecules has a predetermined, substantially identical, electrochromic reconfigurability characteristic.

41. The method as set forth in claim 40 wherein said molecules exhibit an electric field induced band gap change.

42. The method as set forth in claim 41 wherein said electric field induced band gap change occurs via a mechanism selected from a group including (1) molecular conformation change or an isomerization, (2) change of extended conjugation via chemical bonding change to change the band gap, and (3) molecular folding or stretching.

* * * * *